N. MARSHALL.
OUTLET BOX.
APPLICATION FILED OCT. 31, 1908.
967,404.
Patented Aug. 16, 1910.
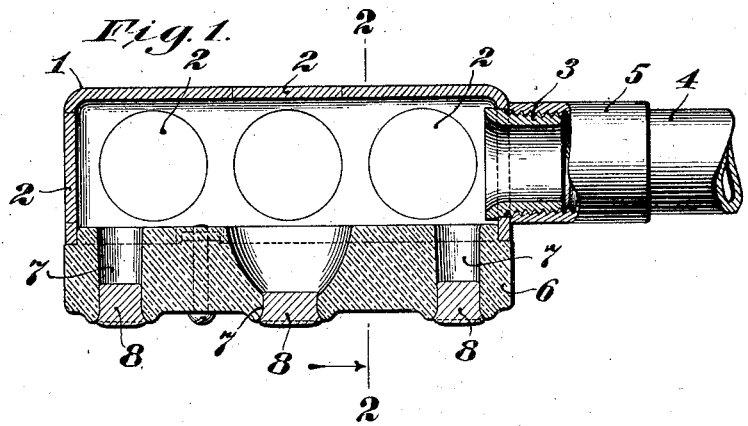
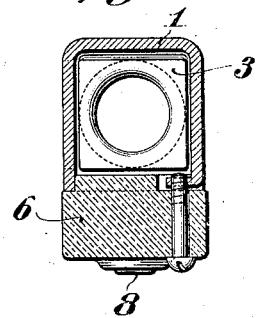
Witnesses:
E. C. Wurdeman
N. D. McPhail
Inventor:
Norman Marshall
by Phillips Van Everen & Fish
Atty.

UNITED STATES PATENT OFFICE.

NORMAN MARSHALL, OF NEWTON, MASSACHUSETTS, ASSIGNOR, BY MESNE ASSIGNMENTS, TO ARROW ELECTRIC COMPANY, OF HARTFORD, CONNECTICUT, A CORPORATION OF CONNECTICUT.

OUTLET-BOX.

967,404.  Specification of Letters Patent.  Patented Aug. 16, 1910.

Application filed October 31, 1908. Serial No. 460,495.

*To all whom it may concern:*

Be it known that I, NORMAN MARSHALL, a citizen of the United States, residing at Newton, in the county of Middlesex and State of Massachusetts, have invented certain new and useful Improvements in Outlet-Boxes; and I do hereby declare the following to be a full, clear, and exact description of the invention, such as will enable others skilled in the art to which it appertains to make and use the same.

The invention relates to pipe ends or outlet boxes such as are used in interior conduit systems for electric wiring. It has been customary to provide the walls of such outlet boxes or pipe ends with a number of circular holes, and to close these holes by removable or knock-out plugs, any of which may be removed to enable the outlet box to be connected with the pipes of the system in any desired position with relation thereto. The devices employed for making the connection between the outlet box and the end of the pipes have usually involved the use of nuts or other screw threaded members located within the outlet box, and arranged to either engage the end of a pipe extending through the hole in the box, or to themselves extend through the hole so as to engage a pipe or union outside the box. These devices have been free to turn within the box, and in making the connection with the end of a pipe it has been found difficult or impracticable to secure a firm connection owing to the inaccessibility of the screw threaded device, and the difficulty with which it is turned within the box in making connection with a fixed pipe, or is held from turning within the box in making connection between a pipe and a fixed box. The time necessarily required in manipulating these connecting devices has also materially increased the cost of installations.

It is one of the objects of the present invention to provide pipe ends or outlet boxes with devices whereby a firm and secure connection between pipes of the system and the box may be quickly and conveniently made, either in connecting a box to a fixed pipe, or connecting a pipe to a fixed box.

To this end one feature of the invention consists in providing an outlet box with a screw threaded connecting device located within the box, and providing means for preventing the turning of the device within the box. It is preferred to make the securing device in the form of a threaded nipple adapted to extend through any one of the circular holes in the wall of the box, and provided with a head located within the box, and so shaped that the nipple is held from turning by engagement with the interior of the box. With this construction the nipple may be firmly screwed into a union on the end of a pipe by turning the outlet box in case the pipe is fixed, or by turning the pipe in case the box is fixed, and without inconvenience or loss of time.

It is customary to provide outlet boxes with porcelain covers having holes formed therein, through which the conductors are led from the interior of the box. It is desirable that there should be no openings through the cover except those through which the conductors lead, and it has been customary to provide covers having different numbers of holes, and in making an installation to use the cover for each outlet box having the desired number and location of holes. This necessitates the carrying in stock of a large variety of covers, and also frequently causes delays, in case the desired cover does not happen to be at hand.

It is a further object of the invention to provide a cover for outlet boxes which may be used for different numbers and differently located leading out conductors, thereby avoiding the necessity for carrying a large variety of covers in stock, and minimizing delays.

To this end a further feature of the invention consists in providing the porcelain cover of an outlet box with a plurality of conductor holes plugged with a cement which may be broken or knocked out without injury to the porcelain, and which when removed leaves the conductor hole in such shape that there is no danger of injury to the conductor leading therethrough. With this construction the cement may be removed from any desired hole, leaving the cover otherwise intact.

The features of the invention will be readily understood from an inspection of the accompanying drawings, in which an outlet box is shown embodying these features in their preferred forms.

In the drawings Figure 1 is a vertical sectional view through the center of an outlet box or pipe end, and Fig. 2 is a transverse sectional view on line 2—2, Fig. 1.

As shown in the drawings the outlet box or pipe end consists of a casing 1 drawn up from sheet metal. A number of circular holes are formed in the walls of the box, and are closed by knock-out plugs 2, any of which may be removed to enable a connection to be made between the box and the end of a pipe, in accordance with the position which the box is to occupy in the system of piping.

The means for making the connection between the end of a pipe and the outlet box comprises a cylindrical nipple 3 screw threaded on its periphery, and of a size to fit loosely in the holes through the wall of the box. The nipple is provided upon its inner end with a polygonal head, the head in the construction shown being rectangular. This head lies within the outlet box, and the holes through the wall of the box are so arranged, and the head of the nipple is of such a size that the interior of the box and the head form means for preventing the turning of the nipple within the box by its engagement with the interior of the box. In connecting the box to the end of a fixed pipe 4 for instance, the nipple may be screwed into the union 5 at the end of the pipe by grasping and turning the box. This manner of screwing the nipple into the union enables the connection to be quickly made without inconvenience or care upon the part of the workman. The nipple may be screwed firmly into the union so that a firm and tight joint is made, since a wrench may be readily applied to the outlet box, and as much force as is required may be applied in screwing up the nipple. In making connection between a pipe and a box which is held in fixed position by reason of its connection to a fixed pipe, the nipple may be firmly screwed into the union at the end of the pipe by merely introducing it into the union and then turning the pipe. Since the nipple is held from turning in the outlet box, a firm and rigid connection can be quickly and conveniently made in this manner.

The outlet box shown is provided with a cover 6 of porcelain or other suitable insulating material, and this cover is provided with a plurality of conductor holes 7, there being three of such holes in the cover shown. These outlet holes are plugged with a cement in the nature of sealing wax such as is used in covering metallic parts in the manufacture of electrical fixtures. The conductor holes are so shaped that when the plugs 8 of cement are molded or cast within the holes, both ends of the plugs will be of larger diameter than the intermediate part, and thus the plugs will be firmly held in the conductor holes without danger of dropping out or of becoming accidentally removed. In making an installation, a hole through the cover in the desired position, or the desired number of holes in the cover, may be readily formed by knocking the cement out of the desired hole or holes. The cement is of such a character that it may be removed without injury to the porcelain, and when removed leaves the surface of the hole smooth and unbroken, and in the same condition that it would be in if the cement had not been introduced therein.

While I prefer to employ the specific construction shown and described in practicing the invention, it will be understood that the construction and arrangement of the parts may be varied and modified without departing from the broader features of the invention.

Having explained the nature and object of the invention, and specifically described one form of outlet box in which it may be embodied, what I claim is:—

1. An outlet box provided with two walls which are substantially at right angles to each other, an aperture through one wall, and a screw-threaded nipple extending through the aperture and provided with a head arranged to engage the interior of the other wall and to be held from turning by said engagement, whatever the position of the nipple in the aperture, substantially as described.

2. An outlet box provided with two walls which are substantially at right angles to each other, an aperture through one wall, a union and a connecting device having screw-threaded engagement with the union and held from turning by the engagement of its periphery with the other wall, whatever its position within the box with relation to the union, substantially as described.

In testimony whereof I affix my signature, in presence of two witnesses.

NORMAN MARSHALL.

Witnesses:
ANNIE C. RICHARDSON,
N. D. McPHAIL.